United States Patent [19]

Fisk et al.

[11] Patent Number: 4,587,612

[45] Date of Patent: May 6, 1986

[54] ACCELERATED INSTRUCTION MAPPING EXTERNAL TO SOURCE AND TARGET INSTRUCTION STREAMS FOR NEAR REALTIME INJECTION INTO THE LATTER

[75] Inventors: Dale E. Fisk; Robert L. Griffith, both of San Jose; Merle E. Homan, Los Gatos, all of Calif.; George Radin, Piermont, N.Y.; Waldo J. Richards, San Jose, Calif.

[73] Assignee: International Business Machines Corporation, Armonk, N.Y.

[21] Appl. No.: 516,607

[22] PCT Filed: Oct. 22, 1982

[86] PCT No.: PCT/US82/01496

§ 371 Date: Dec. 22, 1982

§ 102(e) Date: Dec. 22, 1982

[51] Int. Cl.[4] .............................................. G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,543,245 | 11/1970 | Nutter | 364/200 |
| 3,698,007 | 10/1972 | Malcolm et al. | 364/200 |
| 3,997,895 | 12/1976 | Cassonnet et al. | 364/200 |
| 4,096,568 | 6/1978 | Bennett et al. | 364/200 |
| 4,315,321 | 2/1982 | Parks et al. | 364/200 |

OTHER PUBLICATIONS

Radin, "The 801 Minicomputer", ACM Proceedings of the Symposium on Architectural Support for Programming Languages and Operating Systems, Mar. 1-3, 1982, pp. 39-47.

Patterson & Sequin, "RISC 1: A Reduced Instruction Set VLSI Computer", IEEE 8th Annual Symposium on Architecture Conference Proceedings of May 12-14, 1981, pp. 443-449.

Primary Examiner—Raulfe B. Zache
Attorney, Agent, or Firm—R. Bruce Brodie

[57] ABSTRACT

If a predetermined field (FIG. 3/27) within a source instruction indexes and accesses a body of control information from memory (FIG. 2/5), and if control information (FIG. 4) designates the field-to-field (register-to-register) mapping (FIG. 6), then a skeleton target instruction (FIG. 3/29; FIG. 4) can be filled in by either selectively copying the fields of the source instruction or otherwise computing same. If the mapping is executed by an interposed independent processor then overlapping of such conversion enhances throughput, the independent processor converting multifield instructions for a CPU of a first kind to multifield instructions for a CPU of a second kind without disrupting the logical flow or execution of either source or target instruction streams.

8 Claims, 6 Drawing Figures

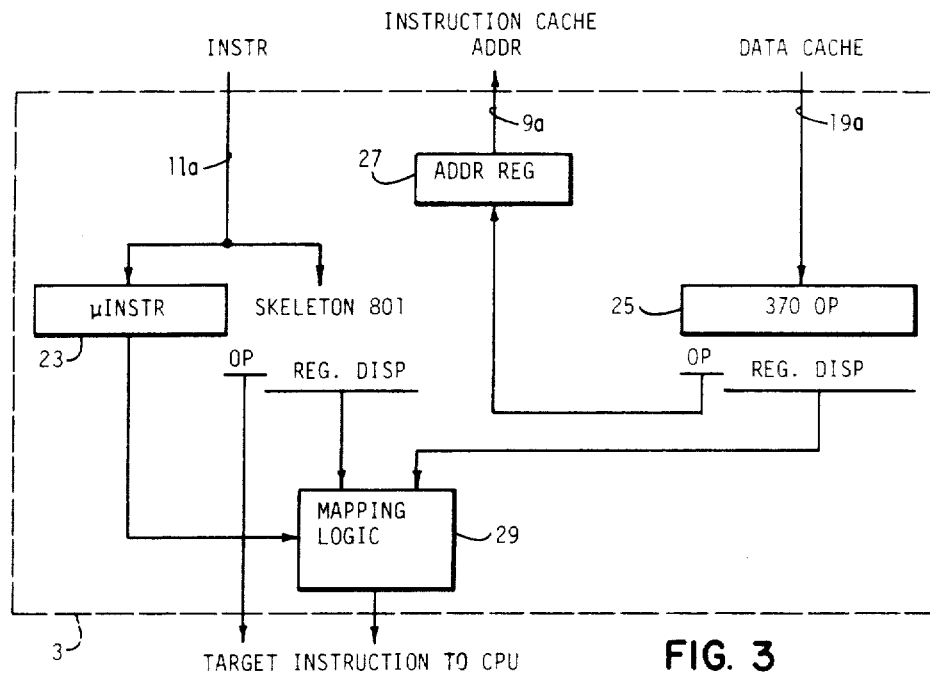

ACCELERATED INSTRUCTION MAPPING EXTERNAL TO SOURCE AND TARGET INSTRUCTION STREAMS FOR NEAR REALTIME INJECTION INTO THE LATTER

TECHNICAL FIELD

This invention relates to a facility for realtime format conversion of multifield instructions for a CPU of a first kind to multifield instructions for a CPU of a second kind by facilities external to the CPU of the second kind and without disrupting the logical flow or execution of either source or target instruction streams.

BACKGROUND ART

It has long been desired to execute instructions programmed for a first type of computing machine on another computing machine with dissimilar characteristics without the need for reprogramming. This is similar to translating Chinese poetry into, say, a European language. Rarely, would there be a one-to-one match of words so that some type of approximation or determination of the contexts in which the words occur could be made. To enable the "program" translation from one machine to another, the technique called "emulation" evolved. That is, a facility resident in a target machine was used to "interpret" instructions from another or source machine. Absent a significant one-to-one match between source machine and target machine instructions, the target machine facility attempted to identify the most appropriate target machine instruction or sequence of instructions from the "context" of the source instruction in the source instruction stream.

A program in execution on a machine is termed a "process". During its existence, a process goes through a series of discrete states. Various events can cause a process to change states. However, the manifestation of the process in an operating system is a "process control block" (PCB). The PCB is a data structure containing certain important information about the process. Consequently, the process control block is a source of information that can be utilized by a target machine in order to "interpret" instructions. Such an approach is illustrated by Parks et al, U.S. Pat. No. 4,315,321, "Method and Apparatus for Enhancing the Capabilities of a Computing System". That is, Parks uses information within the control block to interpret which one of several microcode sequences to use in interpreting a given source instruction.

Source and target instructions may also differ simply in the number of bit positions they regularly occupy. Because large computers can execute several functions simultaneously, a large machine instruction consists of several fields. The problem addressed by Nutter, U.S. Pat. No. 3,543,245, "Computer Systems", was that of mapping a source machine instruction into a target machine instruction of different widths in which the contents of the fields were often the same. Nutter observed that the OP code portion of a CPU multifield instruction can be used to select the instruction fields and their microcode instruction order and by appropriate masking, switching, and shifting could accommodate the fact that the target instruction had a width different than that of a source machine instruction. This was described by Nutter in his specification, column 6, line 23, through column 10, line 53, with reference to field selection, while the mapping of randomly ordered fields in the source word into predetermined positions in a target word is set out at column 62, lines 5-36.

Other pertinent references include Cassonnet et al, U.S. Pat. No. 3,997,895, "Data Processing System with a Microprogrammed Dispatcher for Working Either in Native or Non-native Mode", issued 14 Dec. 1976, and Malcolm et al, U.S. Pat. No. 3,698,007, "Central Processor Unit Having Simulative Interpretation Capability", issued 10 Oct. 1972. Cassonnet depicts a microprogrammable switch (130) responsive to preselected bit position contents in an external instruction for having control stored microcode sequences interpreted respectively by the arithmetic logic unit (ALU 1317) or emulator unit (EMU 1316). Malcolm uses the OP code of the simulated instruction as an index into a set of simulator routines, and provides for storage of a base address to which the OP code index is an offset. Lastly, each instruction references only one operand. This configuration directly executes the intent of the non-native instructions.

A class of VLSI implementable computers with reduced instruction sets being driven by a respective data stream and instruction stream from corresponding caches has been described by Radin in "The 801 Minicomputer", appearing in the ACM Proceedings of the Symposium on Architectural Support for Programming Languages and Operating Systems", March 1-3, 1982, in Palo Alto, Calif., at pages 39-47. A similar CPU architecture was described by Patterson and Sequin in "RISC 1: A Reduced Instruction Set VLSI Computer", in the IEEE 8th Annual Symposium on Architecture Conference Proceedings of May 12-14, 1981, at pages 443-449, and in expanded form in IEEE Computer, September 1982 at pages 8-20. In this type of machine, instructions are obtained from an "Instruction Cache", and data is obtained from a separate (data cache), both of which are managed by an LRU information algorithm. Thus, all frequently used functions and data are likely to be found in their respective cache.

THE INVENTION

It is an object of this invention to convert multifield source instructions into multifield target machine instructions and insert them into a target machine instruction stream without otherwise perturbing the normal target machine instruction execution sequence. It is a related object to devise an efficient method of mapping the register space and constants of the source instruction set into that of the target wherein the method does not participate itself in the execution of these instructions. It is still a further object that such a conversion be executed external to the target machine and in near realtime, permitting the target machine to participate in emulations without itself being substantially modified.

The foregoing objects are satisfied by a method for transforming source instructions ordinarily executable by a first CPU-type (source machine) into one or more instructions (code words) to be directly injected into the executable code stream of a second CPU-type (target machine). The method steps comprise (a) fetching a microinstruction comprising a control section and a skeleton target CPU instruction from a memory at a location addressed by a predetermined field of said source instruction; (b) filling in the skeleton according to the control section contents by copying or computing from selected fields of said source instructions; and (c) inserting the filled-in target instructions into the target machine instruction stream.

The apparatus of the invention includes a first and second register; means for loading a source instruction into said first register; means responsive to the OP code contents within said first register for loading a microinstruction control section (control word) into the second register; mapping logic conditioned by the control word in the second register for selectively copying (gating out) or computing from source instruction fields into the skeleton instruction; and means for merging the "fleshed out" target instruction into the counterpart target CPU instruction stream.

The invention is predicated on a number of unexpected observations. These are (1) if a data stream comprising multiple field source machine instructions is mapped into the instruction stream of the target machine by an interposed independent processor, it enhances full realtime utilization due to the independent overlapping of such conversion; (2) if the preponderance of the source instruction fields can be used unchanged in the target machine instructions, then reformatting within an independent processor can be implemented by register-to-register transfers; (3) if a predetermined field within a source instruction indexes and accesses a word pair from memory, and if one word of the pair is a control section designating the field-to-field (register-to-register) mapping, and if the other word of the pair is a skeleton target instruction; it can be filled out by the fields of the source instruction; and (4) if target machine instructions are constructed external to said target machine, then the target machine is less complex and admits faster instruction execution.

BRIEF DESCRIPTION OF THE DRAWING

FIG. 3 sets out a bare relation of the source multifield IBM 370 CPU instruction and the microinstruction, including the skeleton target instruction to be fleshed out through the mapping logic contained within the EAP;

FIG. 4 shows a definition of a microinstruction control section used by the EAP in fleshing out a skeleton target machine instruction;

FIG. 5 is a timing diagram of the major reformatting operations of the EAP; and

PREFERRED EMBODIMENT AND INDUSTRIAL APPLICABILITY

Figure 2:
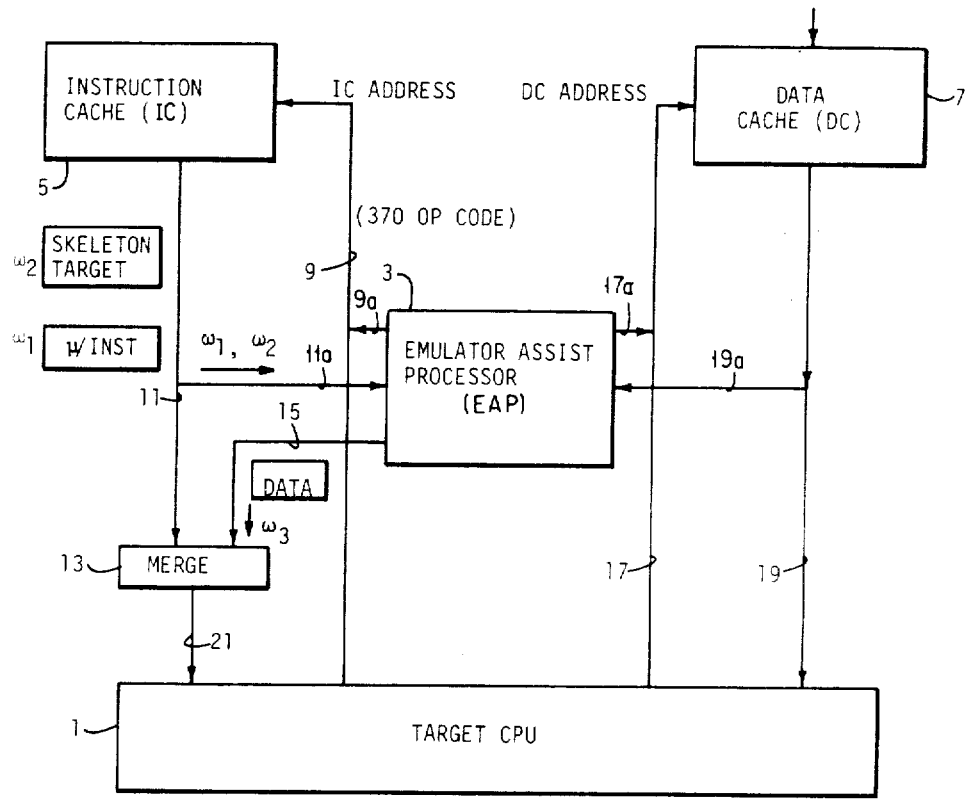
FIG. 2 depicts the emulator-assist processor (EAP) of the invention in communicating relation with the instruction and data caches of the target machine.

While the invention does not reside in the architecture of either the target or source CPU instruction stream generators or receivers, the target CPU does serve as the environment within which the invention is practiced. As the aforementioned Radin and Patterson references exemplify, the new trend in CPU architecture is the use of a reduced instruction set and of independently pipelined instruction and data streams terminating in said CPU. For many years instruction and data reference speeds have been increased by use of least recently used (LRU) managed information caches between the CPU main memory and the target CPU. Thus, the immediately referenced instruction stream is resident in one cache while the immediate reference data stream is referenced in a second. Such a target CPU is shown in FIG. 2.

Typically, the target machine (CPU) 1 is organized to permit independent memory access for the data and instructions. Each access path is served by an independent cache. Thus, instruction cache 5 is accessed by address line 9 with the information therefrom being read over path 11, 13, and 21. Likewise, data cache 7 is accessed over address line 17 and its contents read by target CPU 1 over path 19. However, during realtime instruction translation, data cache 7 writably terminates instruction streams from source CPUs. This means that the data cache is the node from which the source instruction streams are accessed. In this regard, an IBM System 370 CPU is an illustrative multifield instruction stream source whose instructions can be locally stored in data cache 7. A complete description of IBM 370 host architecture is set out in G. M. Amdahl et al, U.S. Pat. No. 3,400,371, issued 3 Sept. 1968. The U.S. Pat. No. 3,400,371 is incorporated by reference.

An apparatus embodiment of the invention is in the form of an emulator assist processor (EAP) 3 accessing data cache 7 by way of address path 17a and read path 19a and the instruction cache 5 by way of address path 9 and read path 11a. The conversion output from the EAP is to target CPU machine 1 over path 15, merge 13, and line 21.

Figure 1:
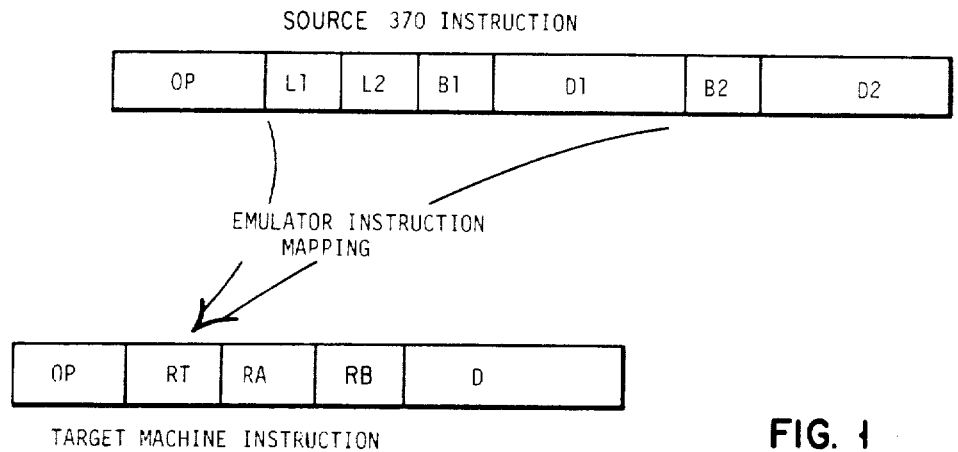
FIG. 1 depicts the fields of an IBM 370 CPU instruction and its general mapping relation to a target machine instruction.

With these factors in mind reference should be made to FIG. 1 depicting the fields of an IMB 370 CPU instruction and its general mapping relations to a target machine instruction. Instructions in the IBM 370 System computers consist of 2, 4, or 6 bytes and can contain up to 3 addresses. Five distinctive formats are used depending on the location of various operands required. The formats include:

1. RR (register/register) instructions. The operands $R_1$ and $R_2$ are CPU general registers. The result is placed in $R_1$.

2. RX (register/index) instructions. A first operand is located in $R_1$ while the other is in main memory. The effective memory address is $X_2 + B_2 + D_2$ where $X_2$ and $B_2$ denote the contents of general registers being used as index and base registers respectively, and $D_2$ is a relative address or "displacement" contained in the instruction. The result is placed in $R_1$.

3. RS (register/storage) instructions. Two operands are in general registers, a third is in main memory.

4. SI (storage/immediate) instructions. In this case, one operand is in main memory while the other is located within a predetermined range of contiguous bit positions of the instruction itself. This is an immediate operand as opposed to the usual operand address.

5. SS (storage/storage) instructions. Both operands are in main memory. The addresses as specified by the instructions are typically the initial addresses of two operand fields whose length is L bytes.

With reference to FIG. 1, the 370 instruction depicts an operation code field, typically of one byte followed by a pair of operands L1, L2 and a pair of base-plus-displacement addresses, namely $B_1$, $D_1$ and $B_2$, and $D_2$. These are to be mapped into a target machine instruction of 32 bits. The target instruction format includes an OP code field occupying bit positions 0-5, an RT field designating the register used to receive the result of an instruction in the positions 6-10, while the RA field in positions 11-15 is the name of the register used for the first operand. Depending on instruction type, the second half of the instruction could include, in positions 16-20, the name of the register used as a second operand, in positions 21-25 the immediate field specifying the operation to be executed by a controller named in an adjacent field of bit positions 26-29. The remaining bit position contents define internal bus operation instructions.

Referring now to FIG. 3, when taken together with FIG. 2, it is apparent that when data cache 7 is addressed over path 17a, the contents consisting of a source instruction, are transmitted over path 19a and loaded into register 25. The OP code of the source instruction, accesses instruction cache 5 by way of address register 27 actuating path 9a. Responsively, a microinstruction control section is transmitted to register 23 over path 11a. Each microinstruction may cause a subsequent microinstruction to be accessed so that each source instruction is replaced by an EAP microcode routine. A microcode instruction consists of a control section and a skeleton target instruction. The skeleton target instruction may have zeroed and/or meaningful register and displacement fields. Control information specifies how fields from the source instruction should be merged into the zeroed fields of the skeleton instruction by the EAP. During emulation, the EAP passes these completed target instructions to the target CPU to be executed. The target CPU executes these instructions normally, except that its instruction address register (not shown) remains fixed and the target CPU makes no attempt to fetch instructions. This parenthetically is termed cycle stealing. During emulation, the target CPU waits for the EAP to give it instructions to execute instead of fetching instructions itself. One way of terminating the translation for any specific source instruction can be upon EAP detection of a zeroed instruction field or a stop bit embedded in a predetermined bit position within a microcode sequence.

In executing translation, the target CPU initializes the EAP registers 27. A suitable state change is made in the target CPU. The first source instruction is fetched into the EAP internal register 25. The OP code portion of the source instruction forms the address to the first microcode instruction for this particular source instruction operation. The microcode instruction is then fetched from the instruction cache. The skeleton target instruction portion of the microinstruction has its zeroed fields filled in from the appropriate fields of 370 instructions. The completed target instruction is then sent to the target machine for execution. Each microinstruction may either link to another microinstruction to be so processed, or it may be the last of a series for the current source instruction. This process is singularly repeated for each 370 or source instruction that is fetched. Significantly, each valid target instruction requires a microcode instruction of two words from the instruction cache. These are the control word and the skeleton target instruction. These are fetched consecutively with the OP code selected control word being first.

Referring now to FIG. 4, there is shown the emulator micro control section format. The format of the 32 bits that make up the control section is allocated as follows: OP is the command to be executed in the EAP, R is the substitution control for the RT and RA target machine register fields. D is the substitution control for the displacement field and the RB target machine register field. C controls the condition codes while NI is the address of the next instruction to be executed by the EAP. If NI is 0, then the EAP will fetch and emulate the next System 370 instruction from the data cache, otherwise it will access the instruction cache again according to the content of the NI. This is aptly drawn in the FIG. 6 enhancement of the EAP 3 shown in FIG. 3. Note in the microinstruction formatted at register 23 in FIG. 6, an alternative to a 0 next instruction address for terminating the EAP fetch from the instruction cache 27 can be by way of a LAST bit position which is set when for terminating the EAP fetch from the instruction cache 27 can be by way of a LAST bit position which is set when the last instruction has been fetched in a sequence from the instruction cache.

Referring now to FIG. 5, there is shown a timing diagram of the major reformatting operations of the EAP in overlap relation (pipelining) to increase throughput. While such pipelining is not the object of this invention, it is evident that significant performance throughput can be obtained.

The register transformation technique between the source and target register spaces provides significant performance gains. For example, because of the pipelining and merging of reformatted instructions from the EAP into the target machine instruction stream, the target machine which might normally execute instructions only every other cycle would permit execution to take place every cycle. This permits the EAP to cause repetitive functions to be executed in the target machine at the full execution rate.

Advantageously, the EAP can be operated in a subroutine mode whenever a sequence of source instructions do not require register space mapping. In this mode, the EAP receives regular target machine instructions, instead of microinstructions from the instruction cache and the target machine again runs at full speed. The subroutine mode is terminable when the target machine is asked to execute an instruction which indicates the resumption of translation mode.

Figure 6:
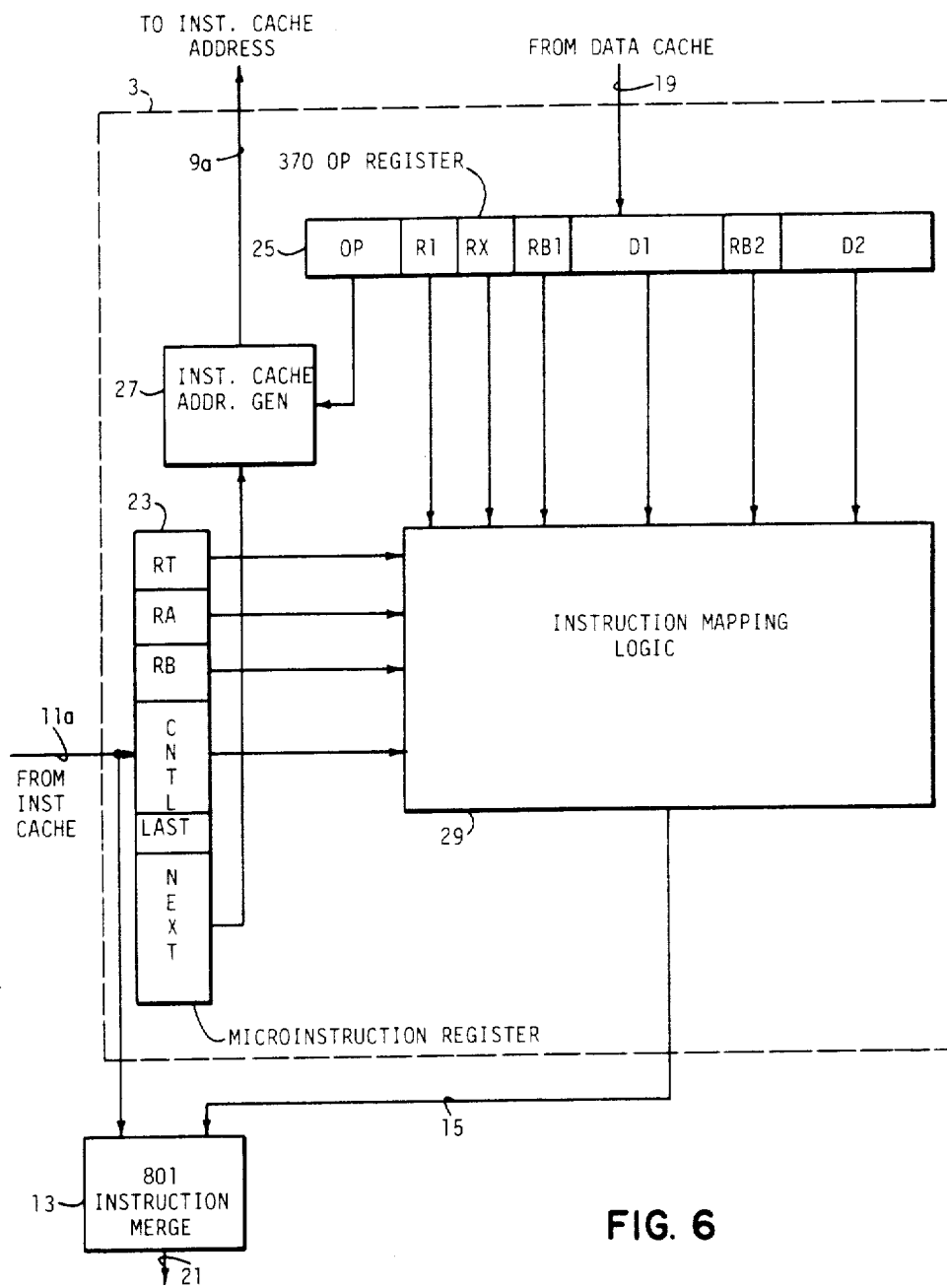
FIG. 6 is a completed field register definition of the EAP set out in FIG. 3.

The embodiment heretofore described presupposes formation by the EAP of a complete target machine instruction by merging data extracted from the source instruction with the skeleton instruction from the instruction cache. This is illustrated in FIGS. 2, 3 and 6. One modification involves intercepting the skeleton target instruction and substituting fields in the complete target machine instruction before passing it into the target CPU, rather than merging it on the fly.

While the invention is particularly described with reference to a preferred embodiment, it is to be appreciated that the method focuses on dynamic register field substitution on the fly. Source instruction strings generated from CPU's other than the IBM System 370 are certainly contemplated.

In order to avoid EAP bottlenecking, a multiple cache target machine is desirable for performance advantages.

We claim:

1. A method for converting a source CPU multifield instruction obtained from memory as data into one or more target CPU multifield instructions; comprising the steps of:

fetching a microinstruction and at least one skeleton target instruction from the memory under control of said source instruction; and filling in the skeleton target instruction according to the microinstruction contents by copying or computing from selected fields of said source instruction into the skeleton instruction.

2. A method according to claim 1 wherein each fetched microinstruction includes an address portion which, if non-zero, designates a memory location of a successive microinstruction to be fetched from the memory or, if zero, indicates termination of the microinstruction code word sequence.

3. A method according to claim 1, wherein the steps of fetching and filling in are performed in time overlap relation.

4. A method according to claim 1, wherein the method comprises the additional step of inserting said filled-in target instruction directly into the executable target CPU instruction stream.

5. A translator for use with a dual cache processing unit for converting instructions stored in the first of two caches as data into counterpart code words executable by the processing unit, the translator comprising:
 means for fetching an instruction from the first cache;
 means for fetching a microinstruction and a skeleton code word from the second cache at a location determined by the operating code portion of the fetched instruction; and
 means for filling in the skeleton code word according to the microinstruction with the fields of the fetched instruction and applying the filled-in code word to the processing unit for execution.

6. A translator according to claim 5, characterized in that the means for fetching an instruction from the first cache and the means for fetching the microinstructions and a skeleton code word each include means for cycle steal accessing the second cache and cycle steal accessing instruction execution cycles of the processing unit.

7. An apparatus for format-converting multi field source instructions stored in a data cache into target instructions and inserting them into an instruction stream obtained from an instruction cache without otherwise perturbing target machine instruction execution, comprising:
 a first and a second register;
 means for accessing the data cache and loading a source instruction into said first register, said source instruction including an OP field;
 means responsive to the OP field contents within said first register for cycle steal accessing the instruction cache and loading a control word into the second register;
 mapping logic conditioned by the control word in the second register for selectively copying or gating out source instruction fields from the first register into the target instruction; and
 means for cycle stealing the target machine and merging the formatted target instruction into the instruction stream.

8. In combination with at least one source and one target CPU of dissimilar executable instruction formats, an apparatus for translating multifield instructions from the source into a target CPU format and for injecting the translated instructions into the directly executable target CPU instruction stream, each source instruction having at least one OP field, comprising:
 memory means;
 means reponsive to each multifield source instruction for fetching a body of control information and skeleton target instructions from said memory means at a location indexed by the source instruction OP field;
 means for filling in the fields of the fetched skeleton target instructions by either selectively copying source instruction fields or otherwise computing their contents according to the fetched body of control information; and
 means for merging the filled in target instructions into the executable instruction stream of the target CPU.

* * * * *